US012728845B2

(12) United States Patent
Wang

(10) Patent No.: US 12,728,845 B2
(45) Date of Patent: Sep. 8, 2026

(54) VEHICLE, AND VEHICLE BODY POSTURE CONTROL UNIT AND METHOD

(71) Applicant: Volvo Car Corporation, Gothenburg (SE)

(72) Inventor: Wei Wang, Shanghai (CN)

(73) Assignee: Volvo Car Corporation, Gothenburg (SE)

(*) Notice: Subject to any disclaimer, the term of this patent is extended or adjusted under 35 U.S.C. 154(b) by 51 days.

(21) Appl. No.: 18/894,070

(22) Filed: Sep. 24, 2024

(65) Prior Publication Data

US 2025/0100550 A1 Mar. 27, 2025

(30) Foreign Application Priority Data

Sep. 26, 2023 (CN) ........................ 202311259723.9

(51) Int. Cl.
*B60R 21/0134* (2006.01)
*B60W 30/085* (2012.01)
(Continued)

(52) U.S. Cl.
CPC ........ *B60W 30/0956* (2013.01); *B60W 30/09* (2013.01); *B60W 2420/403* (2013.01)

(58) Field of Classification Search
CPC ............. B60W 30/0956; B60W 30/09; B60W 2420/403
See application file for complete search history.

(56) References Cited

U.S. PATENT DOCUMENTS 9,701,307 B1 * 7/2017 Newman ............... B60W 30/09
2010/0042323 A1 * 2/2010 Harada ................. B60W 30/08 701/300

(Continued)

FOREIGN PATENT DOCUMENTS

CN 113306550 A * 8/2021 ........ B60W 50/0098
CN 113306550 B 3/2023
DE 102019209728 A1 1/2021

OTHER PUBLICATIONS

Machine Translation of Foreign Reference: CN113306550A—Wang et al. (Year: 2021).*

(Continued)

*Primary Examiner* — Scott A Browne
*Assistant Examiner* — Rami Nabih Bedewi
(74) *Attorney, Agent, or Firm* — Clements Bernard Walker; Christopher L. Bernard

(57) ABSTRACT

A vehicle body posture control method includes acquiring driving state information of a vehicle, object information about one or more objects around the vehicle, and distribution information of people in the vehicle; determining that at least one of the one or more objects is a collision object that will have an unavoidable collision with the vehicle based on the driving state information and the object information; determining the type of shape of the collision object based on the object information; reading structural rigidity data of various parts of a vehicle body from a database related to the bearing capacity of the vehicle body; and determining an adjustment strategy for adjusting the vehicle body posture based on the type of shape of the collision object, the distribution information of the people in the vehicle, and the structural rigidity data of various parts of the vehicle body, to minimize damage and/or injury.

14 Claims, 5 Drawing Sheets

(51) Int. Cl.
*B60W 30/09* (2012.01)
*B60W 30/095* (2012.01)

(56) References Cited

U.S. PATENT DOCUMENTS

| | | | | |
|---|---|---|---|---|
| 2016/0121884 | A1* | 5/2016 | Ciotlos | B60W 30/09 701/1 |
| 2018/0072312 | A1* | 3/2018 | Park | B60W 30/095 |
| 2018/0126983 | A1* | 5/2018 | Beauvais | B60W 10/20 |
| 2018/0162392 | A1* | 6/2018 | Takaki | B60W 30/09 |
| 2018/0225971 | A1* | 8/2018 | Foltin | B60N 2/0027 |
| 2018/0281786 | A1* | 10/2018 | Oyaizu | B60W 30/0956 |
| 2018/0326981 | A1* | 11/2018 | Nakamura | B60W 30/143 |
| 2019/0001969 | A1* | 1/2019 | Moennich | B60W 30/085 |
| 2021/0347355 | A1* | 11/2021 | Laughlin | B60W 30/085 |
| 2022/0126821 | A1* | 4/2022 | Oyaizu | B60W 30/0956 |
| 2022/0363246 | A1* | 11/2022 | Lang | B60W 40/08 |
| 2023/0020240 | A1* | 1/2023 | Woo | B60T 8/171 |
| 2023/0343217 | A1* | 10/2023 | Ciuca | B60W 30/085 |

OTHER PUBLICATIONS

Feb. 12, 2025 European Search Report issued in corresponding EP Application No. 24202316.

* cited by examiner

VEHICLE, AND VEHICLE BODY POSTURE CONTROL UNIT AND METHOD

CROSS-REFERENCE TO RELATED APPLICATION

The present disclosure claims the benefit of priority of co-pending Chinese Patent Application No. 202311259723.9, filed on Sep. 26, 2023, and entitled "VEHICLE, AND VEHICLE BODY POSTURE CONTROL UNIT AND METHOD," the contents of which are incorporated in full by reference herein.

TECHNICAL FIELD

The present disclosure relates generally to the technical field of vehicle control. Specifically, the present disclosure relates to a vehicle, a vehicle body posture control unit, and a vehicle body posture control method. The present disclosure also relates to a corresponding non-transitory computer-readable medium.

BACKGROUND

Among the currently available driving assistance solutions, various solutions exist to avoid the risk of vehicle collisions. These solutions are effective in collision risk avoidance. However, if a collision cannot be avoided, no better solution exists in the current technology. Moreover, when a driver with insufficient driving experience encounters a scene where a collision is imminent, they may panic and maneuver the vehicle erratically, resulting in a more severe collision.

SUMMARY

In this context, the present disclosure aims to provide a technical solution that minimizes collision damage by adjusting the vehicle body posture in situations where a vehicle collision cannot be avoided, taking into consideration the different shapes of collision objects and the varying strengths of different parts of the vehicle body.

According to an embodiment of the present disclosure, a vehicle body posture control method is provided. The method includes the steps of acquiring driving state information of a vehicle, object information about one or more objects around the vehicle, and distribution information of people in the vehicle; determining that at least one of the one or more objects is a collision object that will have an unavoidable collision with the vehicle based on the driving state information and the object information; determining the type of shape of the collision object based on the object information; reading structural rigidity data of various parts of a vehicle body from a database related to the bearing capacity of the vehicle body; and determining an adjustment strategy for adjusting the vehicle body posture based on the type of shape of the collision object, the distribution information of the people in the vehicle, and the structural rigidity data of various parts of the vehicle body, to minimize damage to the vehicle body and/or the people in the vehicle that is to be caused by the unavoidable collision.

According to another embodiment of the present disclosure, a vehicle body posture control unit is provided. The control unit includes an acquisition module configured to acquire driving state information of a vehicle, object information about one or more objects around the vehicle, and distribution information of people in the vehicle; a determination module configured to determine that at least one of the one or more objects is a collision object that will have an unavoidable collision with the vehicle based on the driving state information and the object information, and determine the type of shape of the collision object based on the object information; a reading module configured to read structural rigidity data of various parts of a vehicle body from a database related to the bearing capacity of the vehicle body; and decision-making module configured to determine an adjustment strategy for adjusting the vehicle body posture based on the type of shape of the collision object, the distribution information of the people in the vehicle, and the structural rigidity data of various parts of the vehicle body, to minimize damage to the vehicle body and/or the people in the vehicle that is to be caused by the unavoidable collision.

According to yet another embodiment of the present disclosure, a vehicle is provided. The vehicle includes a sensor unit configured to detect or receive driving state information of the vehicle, object information about one or more objects around the vehicle, and distribution information of people in the vehicle; a database related to the bearing capacity of a vehicle body; and a vehicle body posture control unit configured to perform the method described above.

According to yet another embodiment of the present disclosure, a non-transitory computer-readable medium is provided. The non-transitory computer-readable medium stores instructions which, when executed, cause a processor to carry out the method described above.

The above provides a summary of the main aspects of the present disclosure to enable a basic understanding of these aspects. This summary is not intended to describe key or critical elements of all aspects of the present disclosure, nor is it intended to limit the scope of any or all aspects of the present disclosure. The purpose of this summary is to present some implementations of these aspects in a simplified form as a prelude to the more detailed description that will be provided later.

BRIEF DESCRIPTION OF THE DRAWINGS

The disclosed aspects will hereinafter be described in connection with the appended drawings, which are provided to illustrate but not to limit the scope of the present disclosure.

DETAILED DESCRIPTION

Embodiments of the present disclosure will now be described with reference to the drawings.

Figure 1:
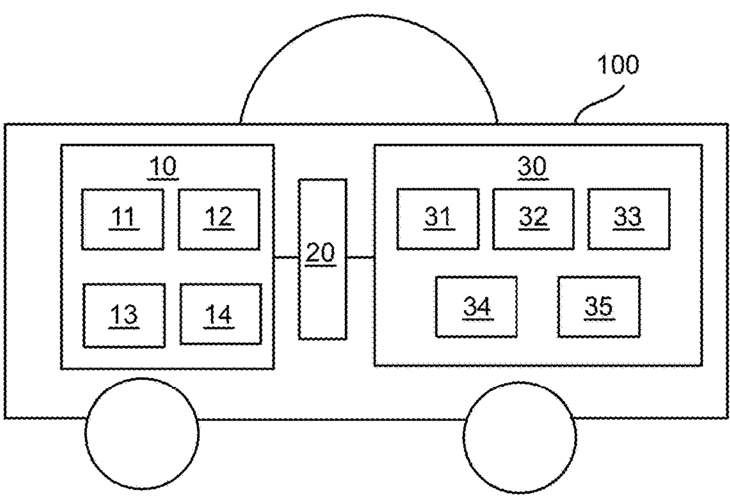
FIG. 1 is a schematic diagram of a vehicle according to an embodiment of the present disclosure.

FIG. 1 schematically illustrates a vehicle 100 according to an embodiment of the present disclosure, which includes a sensor unit 10, a database 20 related to the bearing capacity of the vehicle body, and a vehicle body posture control unit 30.

The sensor unit 10 is used to sense or receive driving state information of the vehicle 100, object information about one or more objects around the vehicle 100, and distribution information of people in the vehicle 100. For example, the sensor unit 10 can include a first sensor 11 for sensing the driving state of the vehicle 100 and providing the driving state information of the vehicle 100, a second sensor 12 for detecting one or more objects around the vehicle 100 and providing the object information, a third sensor 13 for detecting the distribution of people in the vehicle 100, and a fourth sensor 14 for receiving the driving state information and the object information.

The first sensor 11 can include one or more of the following sensors: a vehicle speed sensor, a wheel speed sensor, a lateral acceleration sensor, a longitudinal acceleration sensor, a vertical acceleration sensor, and a yaw rate sensor. The driving state information can be directly obtained from the sensing results of the first sensor 11, or it can be calculated based on those sensing results. The driving state information can include one or more driving state parameters such as vehicle speed, wheel speed, lateral acceleration, longitudinal acceleration, and yaw rate.

The second sensor 12 can include one or more environmental sensors, such as a camera, a millimeter wave radar, a LiDAR (Light Detection and Ranging), and an infrared sensor. The object information can be directly obtained from the sensing results of the second sensor 12, or it can be calculated based on those sensing results. The object information can include static information and/or dynamic information about an object. The static information of the object includes object attribute information, such as one or more of the following pieces of information: type information of the object (e.g., pedestrian, motor vehicle, non-motorized vehicle, tree, building), size information (e.g., length, width, height), and shape information (e.g., flat, vertical wedge, horizontal wedge, cone). The dynamic information of the object includes one or more of the following motion parameters: the movement speed of the object, direction of the object's movement, the predicted trajectory within a predetermined duration after the current time, and the relative distance between the object and the vehicle 100.

The third sensor 13 can include one or more of the following sensors: a pressure sensor on each seat of the vehicle 100 (e.g., the distribution of people in the vehicle can be determined based on seating information from the pressure sensor), and a camera installed in the vehicle 100 for recognizing the internal environment of the vehicle 100 (e.g., the distribution of people in the vehicle can be determined by recognizing videos or images captured by the camera).

The fourth sensor 14 can be implemented as a wireless communication unit provided on the vehicle 100, which receives driving state information of the vehicle 100 and the object information about one or more objects around the vehicle 100 from one or more of an edge cloud, cloud server, and other vehicles.

The database 20, related to the capacity of the vehicle body, is pre-stored in the vehicle 100, and the data within remains unchanged throughout the entire lifecycle of the vehicle 100. The database 20 stores structural rigidity data of the vehicle body, which has strength information for each part of the vehicle body. For example, the database 20 can store: 1) stress intensity data of each part of the vehicle body, such as data based on the material type of each part; 2) stress intensity data at connections between two pieces of material or two components of the vehicle body (the stress situation at these connections is a key focus in collisions); 3) risk stress point data based on the layout of equipment inside the vehicle, for example, determining the parts of the vehicle body that need to avoid being squeezed, punctured, bent, or twisted due to the layout of components containing flammable elements, such as the fuel tank or power battery, to prevent fire after a collision. Furthermore, the database 20 can also store: 4) door design data, which is used to avoid situations where the door cannot be opened due to being squeezed, punctured, bent, or twisted; and 5) energy-absorbing part data, for example, during vehicle body design, special energy-absorbing zones are reserved. These zones are specifically designed parts of the vehicle body that absorb impact energy through deformation, thereby reducing the collision impact transmitted to the occupants in the vehicle. Furthermore, the database 20 can also store data containing information about connection positions of two pieces of material or two components that are prone to tearing on the vehicle body. Connection positions can include one or more of frame rivet positions, potentially loose positions, and connections between the cab and the frame.

Figure 2:
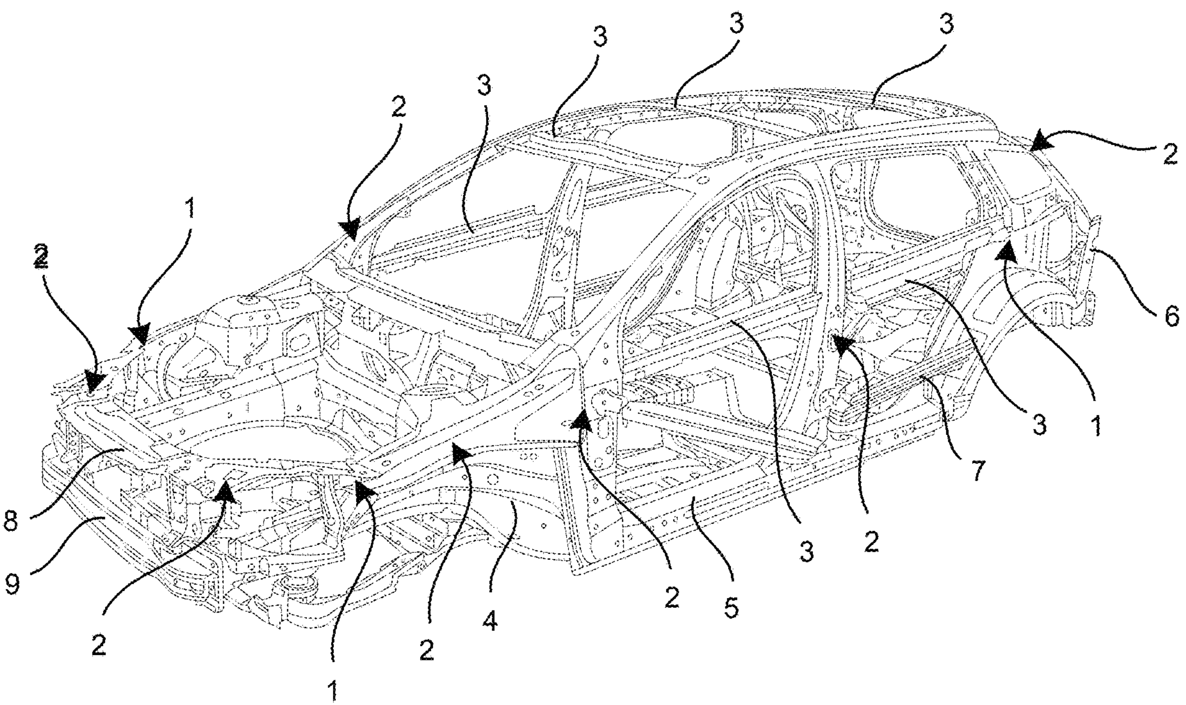
FIG. 2 is a schematic diagram of the vehicle body structure of the vehicle illustrated in FIG. 1.

In an example, the structural rigidity data of the vehicle body in the database 20 is associated with the body structure of Vehicle 100. FIG. 2 schematically illustrates the body structure of the vehicle 100. As shown in FIG. 2, the body part labeled "1" represents the hardest part of the vehicle body; the body part labeled "2" represents the most fragile part of the vehicle body; the body part labeled "3" represents a high-strength steel section; the body part labeled "4" represents a medium-to-high-strength steel section; the body part labeled "5" represents an ultra-high-strength steel section; the body part labeled "6" represents a medium-strength steel section; the body part labeled "7" represents a steel section with a strength level between "high" (i.e., the strength of the part labeled 3) and "ultra-high" (i.e., the strength of the part labeled 5); the body part labeled "8" represents a magnesium alloy section; and the body part labeled "9" represents an aluminum alloy section. In this example, a three-dimensional model of the vehicle body structure, combined with the various body parts shown in FIG. 2, can be used to determine the location of each part on the vehicle body, the force intensity during a collision, and the energy-absorbing capability during the collision. Then, the relevant data is stored in the database. Additionally, the specific locations, dimensions, and adjacent body parts of flammable components inside the vehicle (such as components containing flammable materials like a fuel tank or power battery) can be determined. Then, the relevant data is stored in the database.

In the case where the vehicle body posture control unit 30 determines that there is at least one object among the one or more objects around the vehicle 100 that will have an unavoidable collision with the vehicle 100, the vehicle body posture control unit 30 determines an adjustment strategy for changing the vehicle body posture based on factors such as the structural rigidity of the vehicle body, the shape of the collision object, and the distribution of people in the vehicle, so as to minimize damage to the vehicle body and/or the people in the vehicle that is to be caused by the unavoidable collision.

In an example, the vehicle body posture control unit 30 includes an acquisition module 31, a determination module 32, a reading module 33, a decision-making module 34, and a turning control module 35.

It should be noted that the naming of each module should be interpreted as a logical (functional) description, rather than as a limitation on their physical form or arrangement. These modules can be implemented within the same chip or circuit, or they can be arranged separately in different chips or circuits. One or more of these modules can be further divided into several sub-modules based on their functions.

Each module can be implemented through hardware, software, or a combination of both, including code stored in a non-transitory computer-readable medium and executed as instructions by a processor. When it comes to hardware implementation, it may be embodied in an application-specific integrated circuit (ASIC), a digital signal processor (DSP), a digital signal processing device (DSPD), a programmable logic device (PLD), a field-programmable gate array (FPGA), a processor, a controller, a microcontroller, a microprocessor, an electronic unit, or any combination of these. As for software implementation, it may encompass microcode, program code, or code segments. The software can be stored in a machine-readable storage medium, such as a memory.

The vehicle body posture control unit 30 can be in an ECU (electronic control unit) of the vehicle 100, in a VCU (vehicle control unit) of the vehicle 100, or in a domain controller of the vehicle 100. In instances where the vehicle body posture control unit 30 is implemented as multiple modules mentioned above, it can be arranged such that some modules are in the ECU while others are in the VCU.

Figure 3:
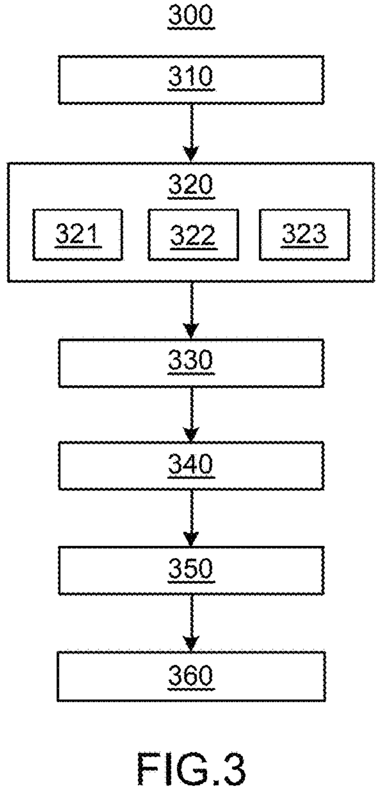
FIG. 3 is a flowchart of a vehicle body posture control method according to an embodiment of the present disclosure.
Figures 4A, 4B, 4C, 4D:
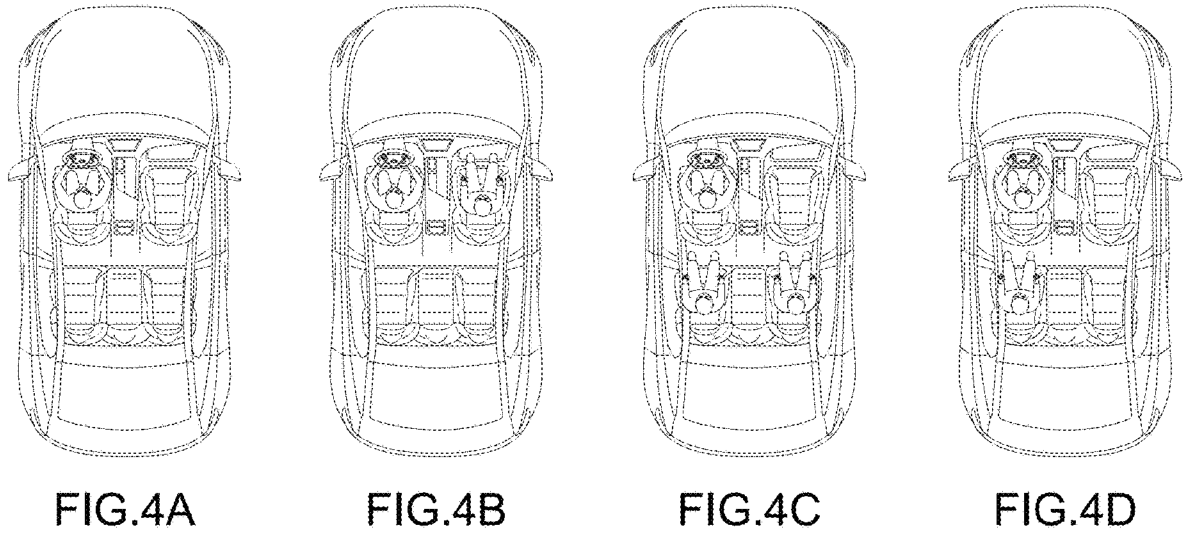
FIGS. 4A-4D illustrate examples of the distribution of people in the vehicle.

FIG. 3 illustrates a vehicle body posture control method 300 according to an embodiment of the present disclosure. The following introduction takes the implementation of the method 300 by the vehicle body posture control unit 30 as an example.

With reference to FIG. 3, at block 310, the acquisition module 31 acquires the driving state information (Info_1) of the vehicle 100, the object information (Info_2) about one or more objects around the vehicle 100, and the distribution information (Info_3) of people in the vehicle. This information can be obtained from the sensor unit 10. Descriptions of examples of this information above are applicable here.

At block 320, the determination module 32 determines that the vehicle 100 will experience an unavoidable collision based on the acquired driving state information and object information. Examples of block 320 are described below.

At block 321, the determination module 32 determines that at least one of the one or more objects is a collision object that will have an unavoidable collision with the vehicle 100 based on the driving state information and the object information. In other words, the determination module 32 determines that the vehicle 100 will experience an unavoidable collision. For example, the determination module 32 determines that the vehicle 100 cannot stop before colliding with an object, based on the maximum deceleration that the vehicle 100 can provide and the relative distance between the vehicle and the object. In this case, it is determined that the vehicle 100 will have an unavoidable collision with the object (i.e., the collision object). It should be noted that the unavoidable collision may also include other scenarios, such as when the vehicle 100 is hit by a fast-moving object while it is moving at a low speed. Additionally, other methods can be employed to determine the unavoidable collision, and the present disclosure is not limited in this regard.

In examples of the present disclosure, the unavoidable collision includes active collisions and passive collisions. An active collision refers to a situation where the vehicle 100, while in motion, collides with an object. A passive collision, on the other hand, refers to a situation where the vehicle 100, while stationary or moving at a slow speed, is collided with an object.

At block 322, the determination module 32 predicts the unavoidable collision scenario between the vehicle 100 and the collision object. The collision scenario includes the collision time (i.e., the moment when the collision will occur), the potential collision points on the vehicle body (i.e., the parts that will be hit), the shape of the collision object, and the collision angle (i.e., the angle at which the vehicle and the object will make contact).

In an example, the determination module 32 may predict a collision scenario in which the vehicle 100 will collide with the collision object based on a planned path of the vehicle 100 and a trend of changes in the state of the collision object. For example, the determination module 32 can receive the planned path of the vehicle 100 and obtain a motion trajectory of the vehicle within a predetermined time period, such as 1 second, 2 seconds, 5 seconds, or 10 seconds, after the current time based on the planned path. The determination module 32 can predict the motion trajectory of the collision object within the predetermined time period based on the current state of the collision object. Next, the determination module 32 predicts the collision scenario according to the motion trajectories of the vehicle and the collision object. It should be noted that the collision object can also be a stationary object, such as an immovable object. In this case, the determination module 32 can predict the collision scenario based on the motion trajectory of the vehicle 100 and the relative distance and position between the vehicle 100 and the collision object.

At block 323, the determination module 32 obtains the distribution of people in the vehicle 100 (i.e., the occupant zone) based on the information regarding the distribution of people. The distribution can be expressed in various ways, for example, it can indicate which row and position in the vehicle are occupied; the passenger seat is occupied; the position near the rear right door is occupied, etc. Some examples of the distribution of people in the vehicle are shown in FIGS. 4A-4D. For example, the distribution illustrated in FIG. 4A can be described as only the driver's seat is occupied. The distribution in FIG. 4B can be described as the front seats are occupied. The distribution in FIG. 4C can be described as the driver's seat and the rear seats are occupied. The distribution in FIG. 4D can be described as the seats on the same side as the driver's seat are occupied.

At block 330, the reading module 33 reads the structural rigidity data of various parts of the vehicle body from the database 20.

At block 340, the decision-making module 34 determines an adjustment strategy for changing the vehicle body posture based on the shape information of the collision object, the distribution information of the people in the vehicle, and the structural rigidity data of various parts of the vehicle body, to minimize damage to the vehicle body and/or the people in the vehicle that is to be caused by the unavoidable collision. In other words, based on the determined adjustment strategy, the current body posture of the vehicle 100 is adjusted to a target body posture to minimize the damage to the vehicle body and/or the people in the vehicle that is to be caused by the unavoidable collision.

The shape information of the collision object can be obtained based on the object information provided by the second sensor 12. In an example, the shape information of the collision object is obtained by performing image recognition on an image including the collision object. In another example, the shape information of the collision object can be obtained by analyzing fused information from multi-modal sensors, including cameras, radar, infrared, and so forth.

In an example, the decision-making module 34 predicts the damage to the vehicle body and/or the people in the vehicle that is to be caused by the unavoidable collision based on the type of shape of the collision object and determines the adjustment strategy for adjusting the vehicle body posture based on the prediction result.

The types of shapes of the collision object include the following predetermined types of shapes.

TypeI

The shape of typeI is such that it will cause face contact between the collision object and the vehicle body, with the contact face being a plane larger than a predetermined area. This contact surface should be understood as a large-area plane, indicating that the collision object collides with the vehicle 100 with a significant contact face. The predetermined area, for example, is 10% of the vehicle body area.

TypeII

The shape of typeII is a vertical wedge shape facing towards the vehicle body that will cause cutting into the vehicle body. Specifically, the vertical wedge is directed towards the front of the vehicle, opposite to the traveling direction. Here, "vertical wedge" refers to the shape of the collision object when viewed vertically, generally featuring a wedge-shaped outer contour. In an example, the "vertical wedge" of the collision object exhibits the following characteristics: the aspect ratio of the overall outline of the contact face between the collision object and the vehicle is greater than a first predetermined ratio (e.g., 10); the maximum lateral dimension of the contact face is lower than a predetermined threshold (e.g., 10 cm); and the ratio of the lateral dimension of any lateral portion of the vertical wedge to the longitudinal distance from the first contact point to that portion is less than a second predetermined ratio (e.g., 0.6). In an embodiment of this example, if the lateral dimension of a lateral portion is 30 cm, the longitudinal distance from the first contact point to that portion must exceed 50 cm. For example, if the ratio of the lateral dimension of the largest lateral portion to the longitudinal distance from the first contact point to that lateral portion is less than the second predetermined ratio, it may cause the vehicle body to tear and stab the occupants (i.e., the people in the vehicle).

TypeIII

The shape of the collision object is a horizontal wedge shape facing towards the vehicle body that will cause cutting into one or more of A, B, C, and D pillars of the vehicle. Specifically, the horizontal wedge shape is directed towards the front of the vehicle, opposite to its travelling direction. Here, the term "horizontal wedge" refers to the shape of the collision object when viewed from a horizontal lateral direction, generally featuring a wedge-shaped outer contour. In an example, the "horizontal wedge" shape of the collision object exhibits the following characteristics: the aspect ratio of the overall outline of the contact face between the collision object and the vehicle is less than a third predetermined ratio (e.g., 0.1); the maximum vertical dimension of the contact face is lower than a predetermined vertical dimension threshold (e.g., 10 cm); and the ratio of the vertical dimension of any vertical portion of the collision object to the longitudinal distance from the first contact point between the collision object and the vehicle to that vertical portion is less than a fourth predetermined ratio (e.g., 0.6). In an embodiment of this example, if the vertical dimension of a vertical portion is 30 cm, the longitudinal distance from the first contact point to that vertical portion must be greater than 50 cm. For example, if the ratio of the vertical dimension of the largest vertical portion of the collision object to the longitudinal distance from the first contact point to that vertical portion is less than the fourth predetermined ratio, it may result in the collision object cutting into one or more of the A, B, C and D pillars of the vehicle.

TypeIV

The shape of the collision object is a cone shape facing towards the vehicle body that will penetrate into the vehicle body. The cone is, for example, directed towards the front of the vehicle in the direction opposite to the traveling direction of the vehicle. Here, "cone" has the following characteristics: the area of the contact surface between its tip and the vehicle does not exceed a predetermined area (e.g., 100 square centimeters); the ratio of the area of the maximum cross-section of the conical collision object (measured in a plane perpendicular to the longitudinal direction of the vehicle) to the longitudinal distance from the maximum cross-section to the tip is less than a fifth predetermined ratio. For example, the ratio of the area of the maximum cross-section of the conical collision object (measured in a plane perpendicular to the longitudinal direction of the vehicle) to the longitudinal distance from the maximum cross-section to the tip is less than 900 square centimeters per 1 meter. This means that if the area of the maximum cross-section is 900 square centimeters, then the longitudinal distance from the maximum cross-section to the tip must be greater than 1 meter. In such a case, the collision between the vehicle and the collision object may result in the vehicle body being pierced.

According to an example of the present disclosure, the determination module 32 may determine the shape of the collision object using a shape recognition model. For example, the contour of the collision object and multiple position points on the contour, such as multiple key points or feature points, are identified from an image of the collision object captured by the second sensor. The identified contour and the position points on it are input into the shape recognition model, where the features of the various shapes mentioned above are stored as rules for determining the shape of the input contour. This allows the model to determine and output which of the four previously mentioned shape types the contour corresponds to.

In an embodiment, the shape recognition model can be implemented as a supervised machine learning model (e.g., a machine learning model for classification). The features of the various shapes mentioned above are used as annotated training data to train the machine learning model. Then, a trained machine learning model is used to analyze the input contour and the multiple position points on it, and to output information indicating which of the four shape types the contour belongs to.

In addition, there are cases where the contour of the shape input to the model does not belong to any of the four types mentioned above. In such cases, the model outputs a conclusion indicating that the contour does not belong to any of those four types.

It should be noted that in the above description, multiple predetermined parameters are involved, such as the first to fifth predetermined ratios and the predetermined area. These predetermined values can be set based on experience and/or model calculations. Moreover, these values can be adjusted based on specific scenarios or user needs to meet the requirements for shape recognition sensitivity and customization.

Figure 5:
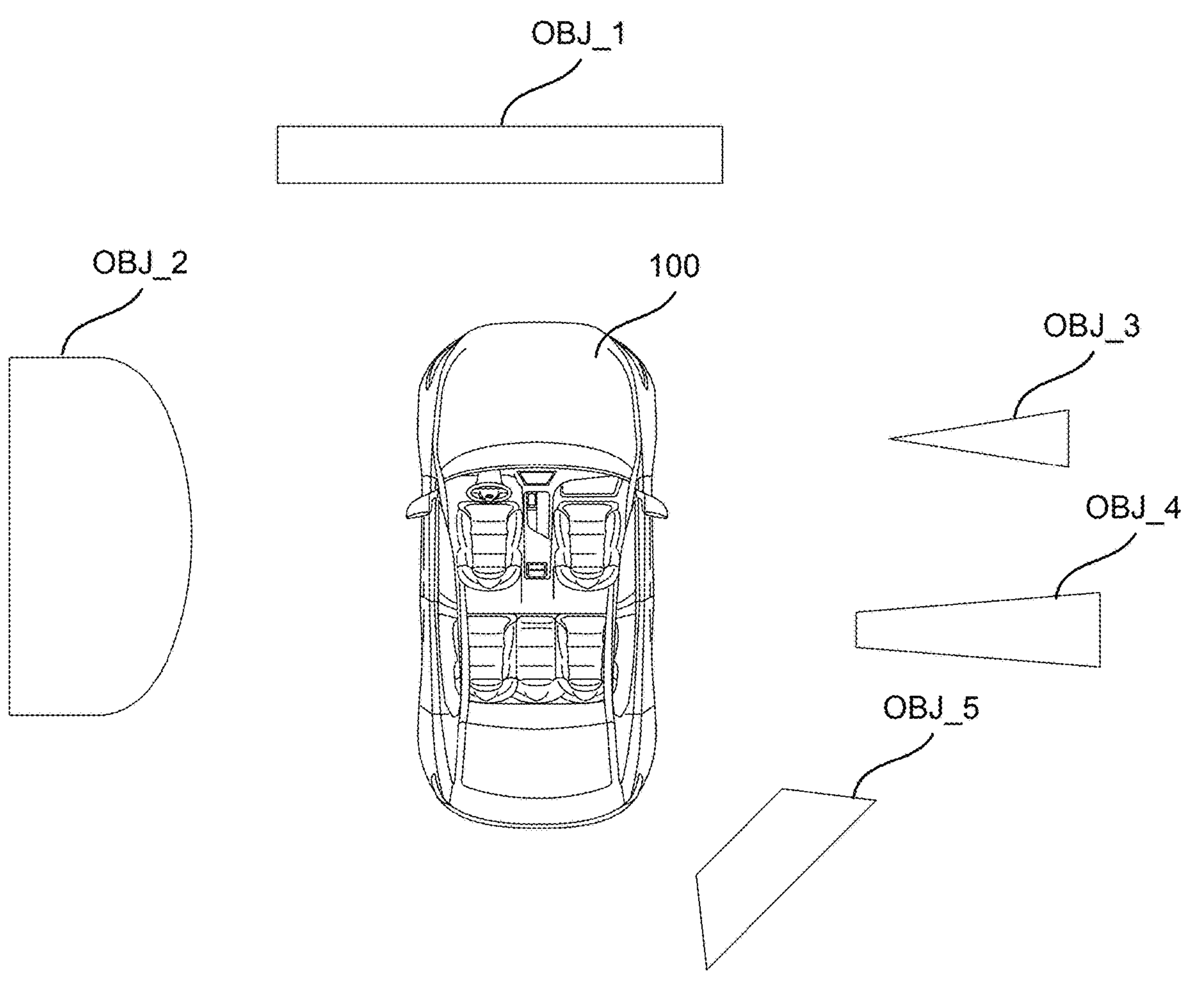
FIG. 5 illustrates examples of different shapes of the collision object.

FIG. 5 shows some examples of the shape of the collision object facing towards the vehicle body of the vehicle 100. As shown in FIG. 5, the shapes of objects OBJ_1 and OBJ_2 belong to typeI, the shape of object OBJ_3 belongs to typeIV, the shape of object OBJ_4 belongs to typeII, and the shape of object OBJ_5 belongs to typeIII.

Embodiments of vehicle body posture adjustment methods for various shape types of collision objects are described below.

Figure 6:
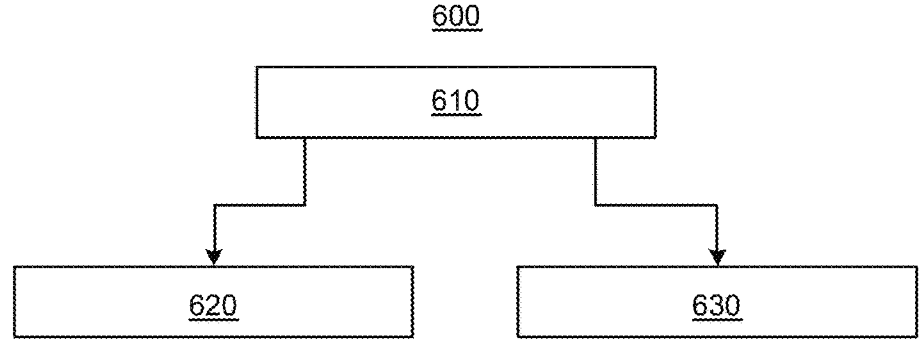
FIGS. 6-10 illustrate examples of the vehicle body posture control method in different collision scenarios.

When the shape of the collision object is typeI, consideration is given to avoiding direct impact on body parts close to occupants (driver and passenger zone) and employing body structures with strong energy absorption capabilities to absorb the collision force. FIG. 6 illustrates a vehicle body posture adjustment method 600 for a collision object of typeI according to an embodiment of the present disclosure.

With reference to FIG. 6, at block 610, when the shape of the collision object is typeI, it is determined whether the predicted collision scenario falls into one of the following predetermined collision scenarios.

1) The collision between the vehicle and the collision object is a 100% frontal overlap collision with a collision angle of 90° (a 90-degree angle).
2) The collision between the vehicle and the collision object is an offset frontal collision (e.g., a 40% to 60% offset collision) with a collision angle of 90°.
3) The collision between the vehicle and the collision object is an offset frontal collision (e.g., a 40% to 60% offset collision) with a non-90° collision angle (i.e., the collision angle is not 90°).
4) The collision between the vehicle and the collision object is a side collision with a collision angle of 90°.

If the determination result of block 610 is affirmative, the method 600 proceeds to block 620.

At block 620, a vehicle body posture adjustment strategy that is suitable for the predicted collision scenario is determined. The adjustment strategy for adjusting the vehicle body posture is described in detail below.

In the case where the predicted collision scenario is the predetermined collision scenario 1), the adjustment strategy is not to adjust the vehicle body posture. Because most vehicles' passive safety protection designs are centered around such a collision scenario, and the front of the vehicle has sufficient energy absorption space, this collision scenario can be considered as the "ideal collision scenario" for an unavoidable collision; thus, no adjustment of the vehicle body posture is needed.

In the case where the predicted collision scenario matches (corresponds to) the predetermined collision scenario 2, the adjustment strategy includes: determining whether the collision point on the vehicle body is far away from or close to the location where people in the vehicle are distributed; when it is determined to be far away, not adjusting the vehicle body posture; and when it is determined to be close, adjusting the vehicle body posture so that the collision that will happen is a 100% frontal overlap collision. Because there are fewer contact surfaces in a non-100% collision, this may lead to a reduced energy absorption effect during the collision and may also cause the vehicle to flip over, resulting in secondary damage. Adjusting the vehicle body posture to promote a 100% frontal overlap collision can avoid such adverse situations.

In the case where the predicted collision scenario is the predetermined collision scenario 3, the adjustment strategy includes adjusting the vehicle body posture so that the collision that will happen is a 100% frontal overlap collision with a collision angle of 90°. Because there are fewer contact surfaces in a non-vertical collision, this may lead to a reduced energy absorption effect during the collision and may also cause the vehicle to flip over, resulting in secondary damage. Adjusting the vehicle body posture to promote a vertical collision can avoid such adverse situations.

In the case where the predicted collision scenario is the predetermined collision scenario 4), the adjustment strategy is not to adjust the vehicle body posture.

It should be noted that after determining the unavoidable collision, vehicle deceleration control will be carried out. The vehicle body posture control according to examples of the present disclosure does not have any impact on the vehicle deceleration control; however, the two controls can be carried out concurrently without affecting each other. The present disclosure relates to examples of vehicle body posture control and does not impose any limitations on vehicle deceleration control.

If the determination result of block 610 is negative, that is, the predicted collision scenario does not match any of the predetermined collision scenarios, the method 600 proceeds to block 630. At block 630, no adjustment to the vehicle body posture is made.

In addition, if the determination result of block 610 is affirmative, on the premise of ensuring a predetermined deceleration (which could be, for example, the maximum deceleration), if the determined adjustment to the body posture cannot be completed based on the vehicle dynamic model and the current vehicle speed before the collision occurs, then the determined adjustment to the vehicle body posture will not be performed. Because if the target vehicle body posture (the vehicle body posture after adjusting according to the determined adjustment strategy) cannot be realized, it is impossible to predict the impact of a collision in the case of a vehicle body posture between the current body posture and the target body posture.

In addition, if the determination result of block 610 is affirmative, on the premise of ensuring a predetermined deceleration, such as a maximum deceleration, if the adjustment to the body posture (determined by a previous step or algorithm) cannot be completed based on the vehicle dynamics model and the current vehicle speed before the collision occurs, then the adjustment to the vehicle body posture will not be performed as it cannot be completed before the collision. Because if the target vehicle body posture (the vehicle body posture after adjusting according to the determined strategy) cannot be achieved, it is impossible to predict the impact of a collision when the vehicle is in a body posture between the current posture and the target posture.

Figure 7:
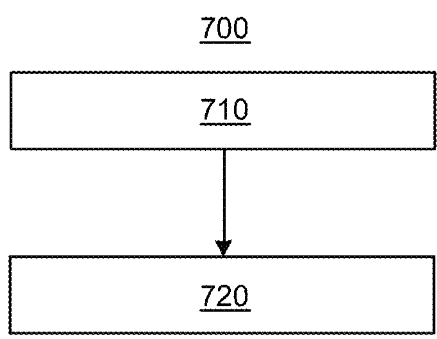

When the shape of the collision object matches (corresponds to) typeII, consideration is given to avoiding tearing of the vehicle body and injuring occupants inside the vehicle. FIG. 7 illustrates a vehicle body posture adjustment method 700 for a collision object of typeII, according to an embodiment of the present disclosure.

With reference to FIG. 7, at block 710, for each of a plurality of potential collision positions on the vehicle body, a collision path of the collision object relative to the vehicle body is calculated, so as to obtain a plurality of collision paths.

At block 720, an optimal collision path is selected from the plurality of collision paths. The optimal collision path is such that the collision point on the vehicle body is away from the occupant zone (the location where people in the vehicle are distributed) and passes through as many high-strength body parts as possible, while avoiding connections between two pieces of material or two components of the vehicle body, such as the connection between the cockpit and the vehicle frame.

Figure 8:
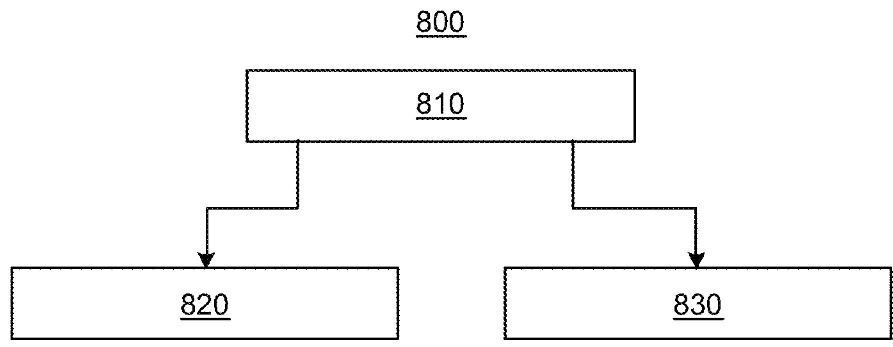

When the shape of the collision object matches (corresponds to) typeIII, consideration is given to whether the collision path will cause the cutting of one or more of the A, B, C, and D pillars of the vehicle. FIG. 8 illustrates a vehicle body posture adjustment method 800 for a collision object of typeIII according to an embodiment of the present disclosure.

With reference to FIG. 8, at block 810, it is determined whether the collision path will cut one or more of the A, B, C, and D pillars of the vehicle based on the predicted collision scenario.

If the determination result of block 810 is affirmative, the method 800 proceeds to block 820. At block 820, the vehicle body posture is adjusted to ensure that the collision path simultaneously contacts as many pillars among the A, B, C, and D pillars as possible, thereby increasing the force-bearing area.

If the determination result of block 810 is negative, the method 800 proceeds to block 830. At block 830, the vehicle body posture is adjusted to ensure that the collision path passes through as many high-strength parts of the vehicle body as possible.

Figure 9:
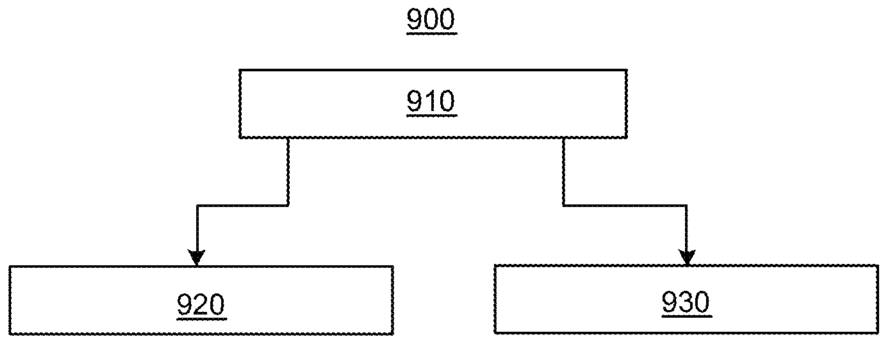

When the shape of the collision object matches (corresponds to) typeIV, consideration is given to the potential penetration of the collision object into the vehicle body. FIG. 9 illustrates a vehicle body posture adjustment method 900 for a collision object of typeIV according to an embodiment of the present disclosure.

At block 910, it is determined whether the body part to be punctured by the collision object is the upper or lower half of the vehicle body based on the predicted collision scenario.

In the case where the determination result of block 910 indicates that the puncture position is on the upper half of the vehicle body, the method 900 proceeds to block 920. At block 920, the vehicle body posture is adjusted so that the puncture position avoids the occupant zone (the location where people in the vehicle are distributed). That is, the vehicle body posture is adjusted to ensure that the puncture position does not intersect with the occupant zone.

In the case where the determination result of block 910 indicates that the puncture position is on the lower half of the vehicle body, the vehicle body posture is adjusted so that the puncture position avoids the occupant zone (the location where people in the vehicle are distributed), and that the puncture path passes through as many high-strength parts of the vehicle body as possible. That is, the vehicle body posture is adjusted not only to avoid the occupant zone but also to ensure that the puncture path traverses as many high-strength parts of the vehicle body as possible.

Returning to FIG. 3, at block 350, the steering control module 35 determines the vehicle steering angle and the turning radius corresponding to the determined vehicle body posture adjustment strategy, that is, the steering angle and turning radius necessary to adjust the vehicle body from its current posture to the target posture.

At block 360, the steering control module 35 controls the steering of the vehicle to match the determined steering angle and turning radius. The steering control includes slip ratio control, braking control, and/or driving control.

Such steering control benefits EVs by allowing quick steering responses through motor torque adjustments. Additionally, adjusting the slip rate expands the vehicle's steering capabilities, enabling it to make extremely tight turns with small radii.

Steering control is applied to the vehicle to match the determined steering angle and turning radius, which includes slip rate control, braking control, and/or driving control.

Figure 10:
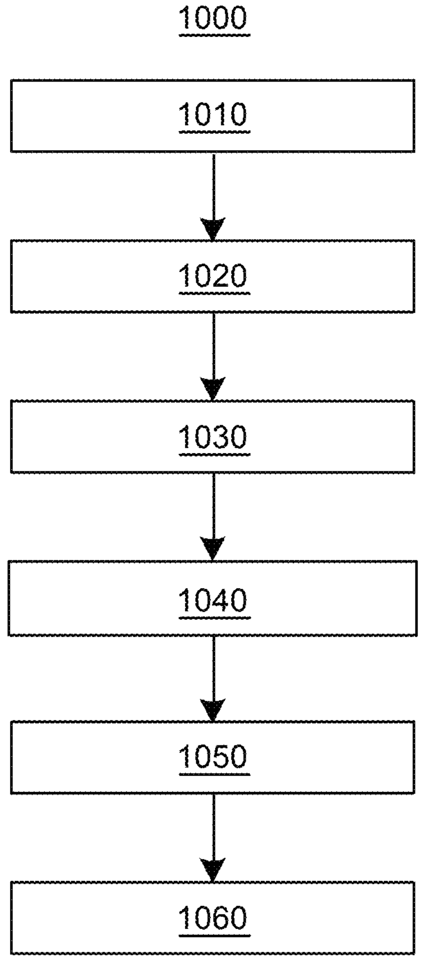

FIG. 10 illustrates a vehicle body posture control method 1000 according to another embodiment of the present disclosure. This method can be applied to situations where the shape of the collision object does not belong to any of the four types mentioned above, and it can be combined with the aforementioned vehicle body posture control method in situations where the shape of the collision object belongs to one of those four types.

With reference to FIG. 10, at block 1010, the decision-making module 34 calculates the adjustable range of the vehicle body posture during maximum deceleration, based on the current vehicle speed and the current road friction coefficient, which includes the steering angle range and turning radius range of the vehicle 100. The current vehicle speed and the current road friction coefficient can be obtained from or calculated based on the driving state information captured by the first sensor 11 and/or the information received by the fourth sensor 14.

At block 1010, the decision-making module 34 determines a plurality of adjustment strategies based on the adjustable range of the vehicle body posture.

At block 1030, the decision module 34 creates an optimization function for the plurality of body posture adjustment strategies. The optimization function includes target parameters, including the contact area of vehicle body parts involved in offsetting collision pressure, the number of high-strength vehicle body parts engaged in the collision, and the distance between the collision point on the vehicle body and the occupant zone.

At block 1040, the decision module 34 obtains the optimal adjustment strategy among the plurality of adjustment strategies by solving the optimization function to maximize the contact area, the number of high-strength parts engaged, and the distance from the collision point to the occupant zone. In an example, the optimization function maximizes the largest possible contact area, the highest number of high-strength parts engaged, and the greatest distance from the collision point to the occupant zone.

At block 1050, the steering control module 35 determines the vehicle steering angle and turning radius corresponding to the optimal adjustment strategy.

At block 1060, the steering control module 35 controls the steering of the vehicle to achieve the determined vehicle steering angle and turning radius. The steering control includes slip ratio control, braking control, and/or driving control of the vehicle.

An embodiment of the disclosure provides a non-transitory computer-readable medium with instructions stored therein which, when executed, causes a processor to carry out the steps of the method described above.

It is noted that all the operations in the method described above are merely exemplary, and the disclosure is not limited to any operations in the method or sequence orders of these operations and should cover all other equivalents under the same or similar concepts.

The processors can be implemented using electronic hardware, computer software, or any combination thereof. Whether these processors are implemented as hardware or software will depend on the specific application and the overall design constraints imposed on the system. By way of example, a processor, any portion of a processor, or any combination of processors presented in this disclosure may be implemented as a microprocessor, a microcontroller, a digital signal processor (DSP), a field programmable gate array (FPGA), a programmable logic device (PLD), state machine, gate logic, discrete hardware circuitry, and other suitable processing components configured to perform the various functions described in this disclosure. The functions of a processor, any portion of a processor, or any combination of processors presented in this disclosure may be implemented as software executed by a microprocessor, a microcontroller, a DSP, or other suitable platforms.

Software should be interpreted broadly to represent instructions, instruction sets, code, code segments, program code, programs, subroutines, software modules, applications, software applications, software packages, routines, subroutines, objects, running threads, processes, functions, and the like. Software can reside on a non-transitory computer-readable medium. Such non-transitory computer-readable medium may include, for example, a memory, which may be, for example, a magnetic storage device (e.g., a hard disk, a floppy disk, a magnetic strip), an optical disk, a smart card, a flash memory device, a random access memory (RAM), a read-only memory (ROM), a programmable ROM (PROM), an erasable PROM (EPROM), an electrically erasable PROM (EEPROM), a register, or a removable disk. Although a memory is shown as being separate from the processor in various aspects presented in this disclosure, a memory may also be internal to the processor, e.g., a cache or a register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalent transformations to the elements of the various aspects of the disclosure, which are known or to be apparent to those skilled in the art, are intended to be covered by the claims.

What is claimed is:

1. A vehicle body posture control method comprising:

acquiring driving state information of a vehicle, object information about one or more objects around the vehicle, and distribution information of people in the vehicle;

determining that at least one of the one or more objects is a collision object that will have an unavoidable collision with the vehicle based on the driving state information and the object information;

determining the type of shape of the collision object based on the object information and determining whether the type of shape of the collision object is one of a plurality of predetermined types of shapes, wherein the plurality of predetermined types of shapes comprise multiple of:

a type of shape that will cause face contact between the collision object and the vehicle body with a contacting area of the contact face being a plane that is larger than a predetermined area;

a vertical wedge shape facing towards the vehicle body that will cause cutting into the vehicle body;

a horizontal wedge shape facing towards the vehicle body that will cause cutting into one or more of A, B, C, and D pillars of the vehicle; and a cone shape facing towards the vehicle body that will penetrate into the vehicle body;

reading structural rigidity data of various parts of a vehicle body from a database related to the bearing capacity of the vehicle body;

determining an adjustment strategy for adjusting vehicle body posture based on the type of shape of the collision object, the distribution information of the people in the vehicle, and the structural rigidity data of various parts of the vehicle body, to minimize damage to the vehicle body and/or the people in the vehicle that is to be caused by the unavoidable collision, wherein, when the type of shape of the collision object is such that it will cause the face contact between the collision object and the vehicle body with the contacting area of the contact face being the plane that is larger than the predetermined area, the adjustment strategy comprises determining whether the collision object is a 100% frontal overlap collision with a 90-degree angle, an offset frontal collision with a 90-degree angle or a non-90-degree angle, or a side collision with a 90-degree angle;

determining a steering angle and a turning radius that correspond to the adjustment strategy for adjusting the body posture; and controlling steering of the vehicle according to the determined steering angle and turning radius, wherein the controlling comprises slip rate control, braking control, and/or driving control of the vehicle.

2. The vehicle body posture control method of claim 1, wherein determining the adjustment strategy comprises:

in the case that the determination whether the type of shape of the collision object is one of the plurality of predetermined types of shapes is affirmative, predicting the damage to the vehicle body and/or the people in the vehicle that is to be caused by the unavoidable collision; and determining the adjustment strategy for adjusting the vehicle body posture based on the prediction result.

3. The vehicle body posture control method of claim 1, wherein, when the type of shape of the collision object is such that it will cause the face contact between the collision object and the vehicle body with the contacting area of the contact face being the plane that is larger than the predetermined area, the adjustment strategy comprises:

in the case that the collision between the vehicle and the collision object is the 100% frontal overlap collision with the 90-degree angle, not adjusting the vehicle body posture;

in the case that the collision between the vehicle and the collision object is the offset frontal collision with the 90-degree angle, determining whether the collision point on the vehicle body to be away from or close to the occupant zone; if it is determined to be away, not adjusting the vehicle body posture; if it is determined to be close, adjusting the vehicle body posture to promote the 100% frontal overlap collision;

in the case that the collision between the vehicle and the collision object is the offset frontal collision with the non-90-degree angle, adjusting the vehicle body posture to promote the 100% frontal overlap collision with the 90-degree angle; and in the case that the collision between the vehicle and the collision object is the side collision with the 90-degree angle, not adjusting the vehicle body posture.

4. The vehicle body posture control method of claim 1, wherein, when the shape of the collision object is the vertical wedge shape facing towards the vehicle body that will cause cutting into the vehicle body, the adjustment strategy comprises:

adjusting the vehicle body posture so that the collision point is away from the occupant zone and the collision path of the collision object passes through high-strength parts of the vehicle body, while avoiding connections between two pieces of material or two components of the vehicle body.

5. The vehicle body posture control method of claim 1, wherein, when the shape of the collision object is the horizontal wedge shape facing towards the vehicle body that will cause cutting into one or more of A, B, C, and D pillars of the vehicle, the adjustment strategy comprises:

in the case where the collision path of the collision object relative to the vehicle body will pass through one or more of the A, B, C, and D pillars of the vehicle, adjusting the vehicle body posture to ensure that the collision path simultaneously contacts as many of the A, B, C, and D pillars as possible, and in a case where the collision path of the collision object relative to the vehicle body will not pass through any pillars, adjusting the vehicle body posture to ensure that the collision path passes through as many high-strength parts of the vehicle body as possible.

6. The vehicle body posture control method of claim 1, wherein, when the shape of the collision object is the cone shape facing towards the vehicle body that will penetrate into the vehicle body, the adjustment strategy comprises:

in a case where the puncture position is on the upper half of the vehicle body, adjusting the vehicle body posture so that the puncture position is away from the occupant zone; and in a case where the puncture position is on the lower half of the vehicle body, adjusting the vehicle body posture so that the puncture position is away from the occupant zone and the puncture path passes through as many high-strength parts of the vehicle body as possible.

7. The vehicle body posture control method of claim 1, wherein the adjustment strategy comprises:

calculating an adjustable range of the vehicle body posture based on the current vehicle speed and the current road friction coefficient;

determining a plurality of adjustment strategies for adjusting the body posture based on the adjustable range;

creating an optimization function for the plurality of adjustment strategies, the optimization function, which comprises target parameters including the contact area of vehicle body parts involved in offsetting collision pressure, the number of high-strength vehicle body parts engaged in the collision, and the distance from the collision point to the occupant zone; and obtaining the optimal adjustment strategy from the plurality of adjustment strategies by solving the optimization function to maximize the contact area, the number of high-strength parts engaged, and the distance from the collision point to the occupant zone.

8. The method of claim 1, wherein the method is carried out via a non-transitory computer-readable medium comprising instructions stored in a memory which, when executed, cause a processor to carry out the method.

9. A vehicle body posture control unit comprising:

an acquisition module configured to acquire driving state information of a vehicle, object information about one or more objects around the vehicle, and distribution information of people in the vehicle;

a determination module configured to determine that at least one of the one or more objects is a collision object that will have an unavoidable collision with the vehicle based on the driving state information and the object information, determine the type of shape of the collision object based on the object information, and determine whether the type of shape of the collision object is one of a plurality of predetermined types of shapes, wherein the plurality of predetermined types of shapes comprise multiple of:

a type of shape that will cause face contact between the collision object and the vehicle body with a contacting area of the contact face being a plane that is larger than a predetermined area;

a vertical wedge shape facing towards the vehicle body that will cause cutting into the vehicle body;

a horizontal wedge shape facing towards the vehicle body that will cause cutting into one or more of A, B, C, and D pillars of the vehicle; and a cone shape facing towards the vehicle body that will penetrate into the vehicle body;

a reading module configured to read structural rigidity data of various parts of a vehicle body from a database related to the bearing capacity of the vehicle body;

a decision-making module configured to determine an adjustment strategy for adjusting vehicle body posture based on the type of shape of the collision object, the distribution information of the people in the vehicle, and the structural rigidity data of various parts of the vehicle body, to minimize damage to the vehicle body and/or the people in the vehicle that is to be caused by the unavoidable collision, wherein, when the type of shape of the collision object is such that it will cause the face contact between the collision object and the vehicle body with the contacting area of the contact face being the plane that is larger than the predetermined area, the adjustment strategy comprises determining whether the collision object is a 100% frontal overlap collision with a 90-degree angle, an offset frontal collision with a 90-degree angle or a non-90-degree angle, or a side collision with a 90-degree angle; and a steering control module configured to determine a steering angle and a turning radius that correspond to the adjustment strategy for adjusting the body posture and control steering of the vehicle according to the determined steering angle and turning radius, wherein the controlling comprises slip rate control, braking control, and/or driving control of the vehicle.

10. The vehicle body posture control unit of claim 9, wherein the decision-making module is configured to:

in the case that the determination whether the type of shape of the collision object is one of the plurality of predetermined types of shapes is affirmative, predict the damage to the vehicle body and/or the people in the vehicle that is to be caused by the unavoidable collision; and determine the adjustment strategy for adjusting the vehicle body posture based on the prediction result.

11. The vehicle body posture control unit of claim 9, wherein the adjustment strategy comprises:

calculating an adjustable range of the vehicle body posture based on the current vehicle speed and the current road friction coefficient;

determining a plurality of adjustment strategies for adjusting the body posture based on the adjustable range;

creating an optimization function for the plurality of adjustment strategies, the optimization function, which comprises target parameters including the contact area of vehicle body parts involved in offsetting collision pressure, the number of high-strength vehicle body parts engaged in the collision, and the distance from the collision point to the occupant zone; and obtaining the optimal adjustment strategy from the plurality of adjustment strategies by solving the optimization function to maximize the contact area, the number of high-strength parts engaged, and the distance from the collision point to the occupant zone.

12. A vehicle comprising:

a sensor unit configured to detect or receive driving state information of the vehicle, object information about one or more objects around the vehicle, and distribution information of people in the vehicle;

a database related to the bearing capacity of a vehicle body; and a vehicle body posture control unit configured to perform a method comprising:

acquiring the driving state information, the object information, and the distribution information;

determining that at least one of the one or more objects is a collision object that will have an unavoidable collision with the vehicle based on the driving state information and the object information;

determining the type of shape of the collision object based on the object information and determining whether the type of shape of the collision object is one of a plurality of predetermined types of shapes, wherein the plurality of predetermined types of shapes comprise multiple of:

a type of shape that will cause face contact between the collision object and the vehicle body with a contacting area of the contact face being a plane that is larger than a predetermined area;

a vertical wedge shape facing towards the vehicle body that will cause cutting into the vehicle body;

a horizontal wedge shape facing towards the vehicle body that will cause cutting into one or more of A, B, C, and D pillars of the vehicle; and a cone shape facing towards the vehicle body that will penetrate into the vehicle body;

reading structural rigidity data of various parts of the vehicle body from the database;

determining an adjustment strategy for adjusting vehicle body posture based on the type of shape of the collision object, the distribution information of the people in the vehicle, and the structural rigidity data of various parts of the vehicle body, to minimize damage to the vehicle body and/or the people in the vehicle that is to be caused by the unavoidable collision, wherein, when the type of shape of the collision object is such that it will cause the face contact between the collision object and the vehicle body with the contacting area of the contact face being the plane that is larger than the predetermined area, the adjustment strategy comprises determining whether the collision object is a 100% frontal overlap collision with a 90-degree angle, an offset frontal collision with a 90-degree angle or a non-90-degree angle, or a side collision with a 90-degree angle;

determining a steering angle and a turning radius that correspond to the adjustment strategy for adjusting the body posture; and controlling steering of the vehicle according to the determined steering angle and turning radius, wherein the controlling comprises slip rate control, braking control, and/or driving control of the vehicle.

13. The vehicle of claim 12, wherein determining the adjustment strategy comprises:

in the case that the determination determining whether the type of shape of the collision object is one of the plurality of predetermined types of shapes is affirmative, predicting the damage to the vehicle body and/or the people in the vehicle that is to be caused by the unavoidable collision; and determining the adjustment strategy for adjusting the vehicle body posture based on the prediction result.

14. The vehicle of claim 12, wherein the adjustment strategy comprises:

calculating an adjustable range of the vehicle body posture based on the current vehicle speed and the current road friction coefficient;

determining a plurality of adjustment strategies for adjusting the body posture based on the adjustable range;

creating an optimization function for the plurality of adjustment strategies, the optimization function, which comprises target parameters including the contact area of vehicle body parts involved in offsetting collision pressure, the number of high-strength vehicle body parts engaged in the collision, and the distance from the collision point to the occupant zone; and obtaining the optimal adjustment strategy from the plurality of adjustment strategies by solving the optimization function to maximize the contact area, the number of high-strength parts engaged, and the distance from the collision point to the occupant zone.

* * * * *